United States Patent [19]

Gomez et al.

[11] 3,893,098

[45] July 1, 1975

[54] VISUAL SIGNALING SYSTEM FOR OFFICES

[75] Inventors: Richard T. Gomez, Chicago; Christopher A. Otis, Northbrook, both of Ill.

[73] Assignee: G & O Industries Inc., Chicago, Ill.

[22] Filed: Dec. 20, 1973

[21] Appl. No.: 426,807

Related U.S. Application Data

[63] Continuation of Ser. No. 225,831, Feb. 14, 1972, abandoned.

[52] U.S. Cl. .............. 340/311; 340/213.1; 340/332

[51] Int. Cl. ........................................... H04m 11/04

[58] Field of Search ......... 340/336, 213.1, 311, 332

[56] References Cited

UNITED STATES PATENTS 3,381,286 4/1968 Walsh .............................. 340/213.1

3,430,224 2/1969 Krantz ............................... 340/311

3,550,121 12/1970 Porter, Jr. ......................... 340/213.1

3,623,056 11/1971 Elston ............................. 340/213.1

*Primary Examiner*—Marshall M. Curtis

*Attorney, Agent, or Firm*—William T. Rifkin

[57] ABSTRACT

A completely solid state silent communication system for use in any medical, dental or professional office building. A source of direct current electrical potential is used to gate silicon control rectifiers for the purpose of illuminating predesignated lamps. Illumination of a series of the lamps will read-out a predetermined message. Each and every room containing one of these devices will repeat the same message. This will provide a silent means of transmitting information for any office and/or building.

2 Claims, 5 Drawing Figures

VISUAL SIGNALING SYSTEM FOR OFFICES

This is a continuation, of application Ser. No. 225,831, filed Feb. 14, 1972 now abandoned.

This invention relates to a communication system, and more particularly to a communication system for use in offices and the like which will enable any number of personnel to communicate with each other in a silent manner which is undisturbing to others.

A number of communication systems now in widespread use rely upon audible signals in one form or another. Such systems frequently include intercom and inter-telephone communication which nevertheless require an audible signal. In many instances, it is desirable to make use of a communication system which is completely silent in operation and yet is capable of transmitting a signal to a number of locations simultaneously.

Various noiseless or silent communication systems are known to those skilled in the art. One such system is disclosed in U.S. Pat. No. 3,430,224. In the system described in this patent, use is made of a plurality of units each of which is provided with a number of signal lamps. The message is transmitted by actuating a switch on one of the units which serves to energize the corresponding lamp in all of the units. The system as described by this patent is quite inflexible since it is incapable of sending unit signals. Thus, in the patented system only one actuating means can be utilized at one time, thereby severely restricting the number of signals which can be transmitted.

It is accordingly an object of the present invention to provide a communication system for use in offices or the like which is capable of transmitting a visual signal to a plurality of different locations simultaneously, which can be installed in existing buildings in a simple and economical manner and which is compact and easy to manufacture and use.

It is a related object of the invention to provide a silent communication system which is capable of transmitting a substantially unlimited number of coded or uncoded signals to a plurality of different locations simultaneously and which includes a recognition signal to indicate that a message signal is being transmitted.

These and other objects and advantages of the invention will appear more fully hereinafter, and, for purposes of illustration and not of limitation, an embodiment of the invention is shown in the accompanying drawings in which.

Figure 1:
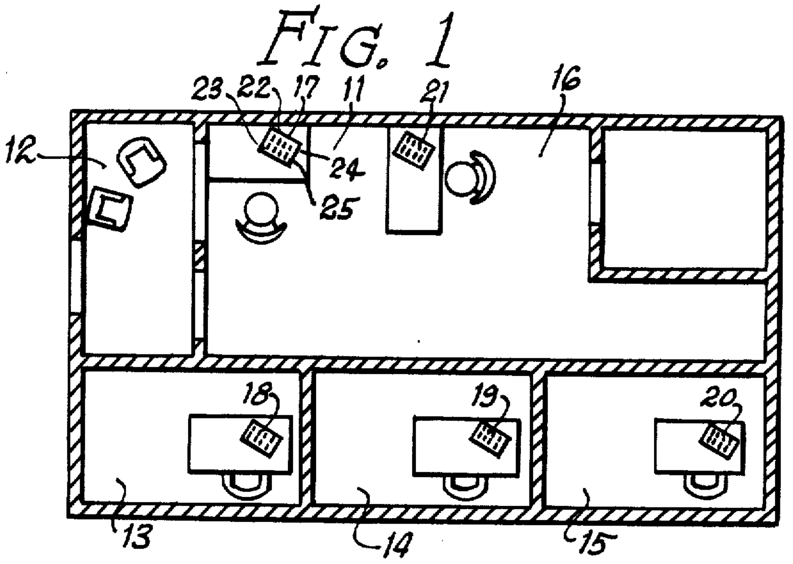
FIG. 1 is a schematic plan view of an office in which the voiceless communication system of the invention can be employed.

The concepts of the present invention reside in a voiceless communication system formed of a master unit including a source of electrical energy and a plurality of master units at different locations remote each from the other and remote from the master unit, with the master unit and the remote unit being interconnected by suitable circuit means. Each of the master and remote units are provided with a plurality of indicator lamp and actuator means associated therewith and a recognition signal lamp and actuator means associated therewith. In the preferred embodiment of the invention, the lamps and actuator means associated therewith are combined in the form of an illuminated push-button switch.

The circuit means interconnecting the units serves, when the actuator means associated with a particular indicator lamp is actuated on any one of the units, to energize the lamp associated therewith and the corresponding lamp on all of the other units is simultaneously energized. At the same time, the circuit means energizes flasher circuit means to cause the recognition signal lamp on each of the master and remote units to flash on and off to thereby serve to attract attention to the fact that a message is being transmitted. Activation of the actuator associated with the recognition signal lamp serves to de-energize not only the recognition signal indicator but also any and all of the indicator lamps which had previously been energized. Thus, once the signal or message has been recognized by its recipient, the recipient may acknowledge receipt of the message by de-energizing the indicator lamp by actuation of the actuating means associated with the recognition lamp.

Referring now to the drawings for a more detailed description of the invention, the invention is shown, for purposes of illustration, in an office in which there are stationed a single executive and a secretary. However, it will be understood by those skilled in the art that the present invention is not limited to the arrangement illustrated in the drawings, since the system of the present invention can be used in any environment in which communication among remote locations is desirable, including medical, dental or other professional offices as well as business offices.

In FIG. 1, there is shown a typical office in which a secretary can be ordinarily stationed in a secretary's office 11 in which she can serve as a receptionist for visiting businessmen receiving them in the reception room 12. The executive can have any desired number of rooms such as indicated as 13 and 14, with tables and chairs for conferences, meetings or interviews. There also can be included a private office for the executive, such as that indicated as 15 and an additional office for the secretary such as that indicated as 16.

The remote signalling system of the present invention can include a plurality of signalling units located in a plurality of different locations. In the office layout of FIG. 1, there can be provided a signalling unit in the secretary's office 11 such as a master unit 17 and a number of remote units designated as 18 in room 13, 19 in room 14, 20 in room 15 and 21 in room 16. Thus, remote signalling units can be located in any of the rooms in which either the executive or the secretary may spend any significant portion of time.

Figure 2:
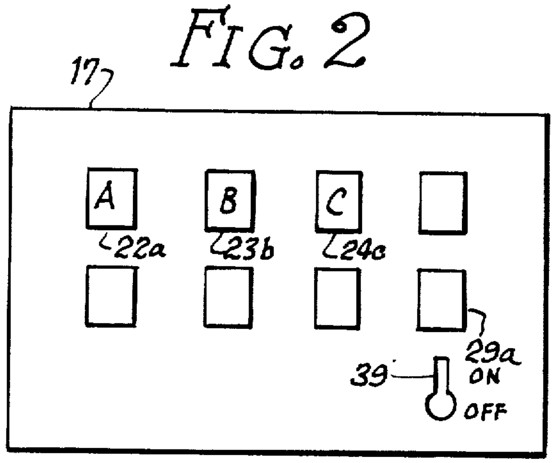
FIG. 2 is a plan view of a master unit for use with the system of the invention.
Figure 3:
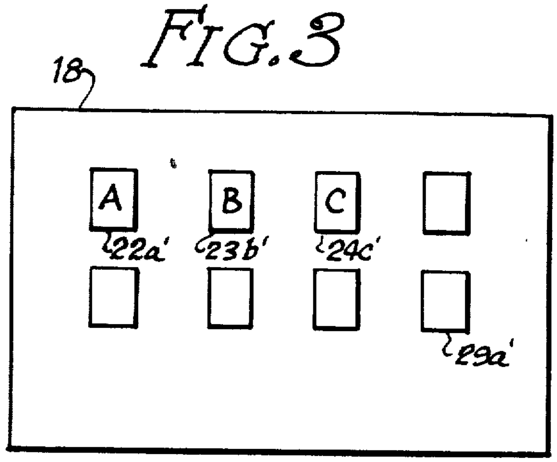
FIG. 3 is a plan view of a typical remote unit for use with the system of the invention.

The master unit 17 and the remote signalling units, as represented by 18, are shown schematically in FIGS. 2 and 3 of the drawing, respectively. Each of the master unit and remote units 17, 18, 19, 20 and 21 are similar in their external appearance and operation from the user's point of view. Normally, one of the units, which can be referred to as the master unit 17, will contain an on - off switch 45 for the system as shown in FIG. 2. As is indicated in both FIGS. 2 and 3, each unit includes a plurality of indicators designated 22, 23 and 24 which may take the form of lettered lights "A", "B" and "C". Associated with each of these indicators is an actuating means for energizing the lamps. Again referring to FIGS. 2 and 3, the master unit will contain a plurality of illuminated push button signals 22*a*, 23*b* and 24*c*, and each remote unit such as that represented as 18 in FIG. 3 will include corresponding illuminated push button switches 22*a*', 23*b*' and 24*c*'.

Each unit will also include actuating means 25 for de-energizing any and all of the lamps as will be described in detail hereinafter. In FIGS. 2 and 3, the actuating means for deenergizing the lamps is shown in the form of an illuminated push button switch 29*a* and 29*a*', respectively.

Suitable control means interconnect the various signal lamps each with the other and with a source of electrical energy, such that the executive may signal the secretary from any one of the rooms in which a unit is located and, conversely, the secretary may signal the executive from any one of such rooms.

Figure 4:
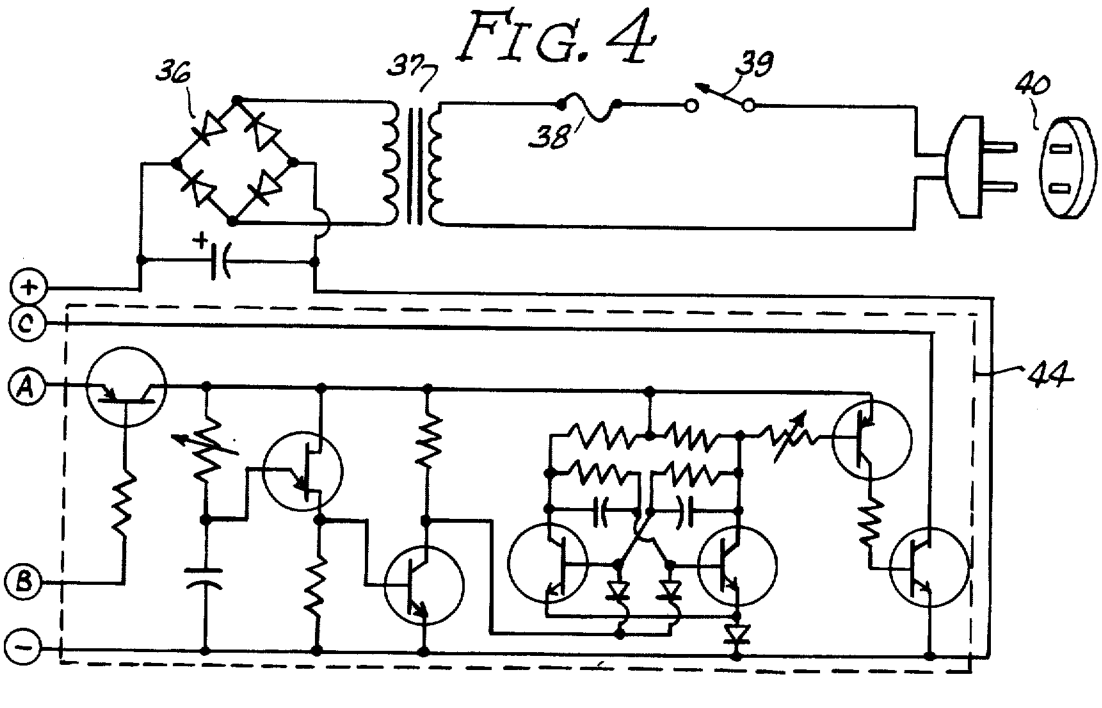
FIG. 4 is a schematic circuit diagram illustrating suitable means for supplying electrical energy to the system of the invention and suitable lamp control means for operation of the recognition signal.
Figure 5:
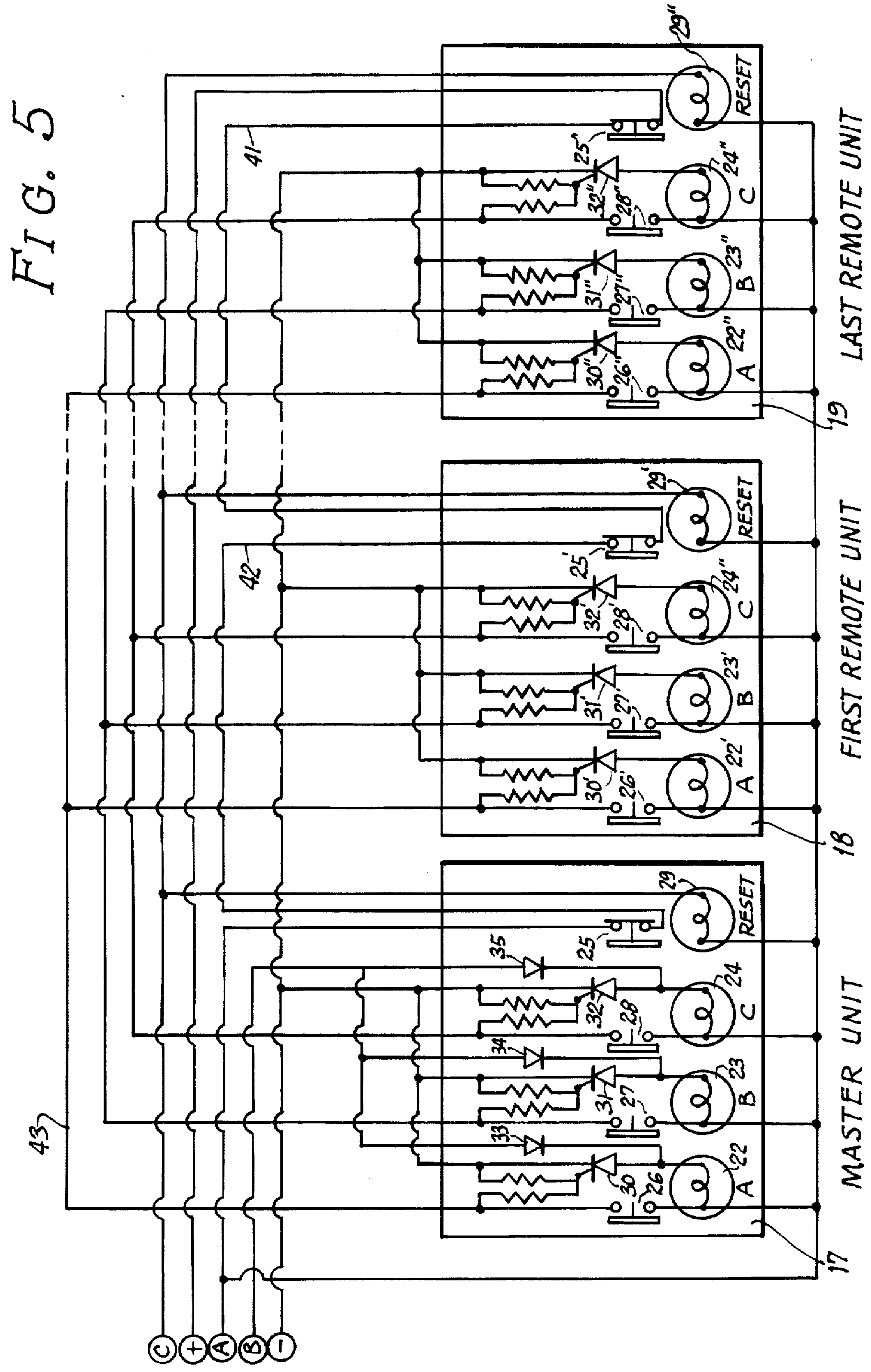
FIG. 5 is a schematic circuit diagram illustrating the components of the master and remote units of FIGS. 2 and 3, respectively.

The manner in which the control means enables the foregoing signaling operations to be carried out will be evident by now referring to the circuit diagram of FIG. 4 and the circuit diagram of FIG. 5. The circuit of the diagram of FIG. 4 is connected to the circuit of the diagram of FIG. 4 by connecting terminals located at the far left portion of each figure. The terminal marked + of FIG. 4 is connected to the terminal marked + of FIG. 5. Similar connections are made between the terminals marked A, B, C and −.

In the lower portion of FIG. 5, the various signaling means 17, 18 and 19 are shown in boxes, the signaling means 20 and the signaling means 21 also being connected to the interconnections in a similar manner as signaling means 18 and also being internally the same as signaling means 18, but not shown in FIG. 5. Since the circuit connections between the signaling means 18, 20 and 21 and the control means of 18, 20 and 21 are identical, a detailed description of the operation of the signaling means 18 will suffice for the operation of 20 and 21, as well.

In the lower portion of FIG. 5 note that in signaling means 17 in the secretary's office there is located three signaling lamps 22, 23 and 24 which are adapted to illuminate the push buttons 22*a*, 23*b*, 24*c*, etc. Connected to each of these signaling lamps is an actuating means in the form of a normally open push button switch 26, 27 and 28 for energizing the lamps. Also located in signaling means 17 is a single lamp 29 used to indicate the signaling lamps are energized and should be de-energized by the use of actuating means 25, a normally closed push button switch. Connected to each of the signaling lamps 22, 23 and 24 are control means 30, 31 and 32 in the form of silicon control rectifiers. Each of the signaling means 18 and 19 have identical lamps, switches and silicon control rectifiers as indicated by primes in 18 and double primes in 19. The function of the diodes 33, 34 and 35 employed in signaling means 17 and the reset or recognition lamps 29, 29' and 29'' will be explained subsequently and is not directly associated with the signaling process.

Referring to FIG. 4, it is evident that Direct Current electrical energy is supplied to the terminals marked + and − by the diode rectifiers 36, transformer 37, fuse 38, main power control switch 39 and a 110 volt outlet 40. With the main power switch 39 closed, electrical energy is continuously available from the supply lead marked + to the return lead marked −.

Referring again to FIG. 5, it is possible to close switch 26 with the following results: Electrical potential will be supplied from the lead marked + through switch 25'', interconnection lead 41, switch 25', interconnection lead 42, switch 25, interconnection lead A, and switch 26 to interconnection lead 43. Electrical energy is therefore supplied to the resistor divider networks connected to the "gate" leads of silicon control rectifiers 30, 30' and 30'' via supply lead 43 and the return lead marked −. Supplying electrical energy to the gates of 30, 30' and 30'' cause them to conduct electrical energy from anode to cathode, thus creating new paths for electrical energy to flow from supply lead 43 through lamps 22, 22' and 22'', silicon control rectifiers 30, 30' and 30'', respectively, to the return lead market −, energizing the lamps 22, 22' and 22''. Opening switch 26 removes the energy supply to interconnection 43, thus removing the energy supply to the gates of silicon control rectifiers 30, 30' and 30''. However, it is the nature of the silicon control rectifier to continue to conduct from anode to cathode as long as electrical energy is flowing from anode to cathode. Thus, lamps 22, 22' and 22'' remain energized after switch 26 is returned to its normally open condition. Since switches 26' and 26'' are in parallel with switch 26, momentarily closing either switch 26' or switch 26'' also causes lamps 22, 22' and 22'' to be energized.

In a similar manner, the momentary closing of either switch 27 or switch 27' or switch 27'' will cause lamps 23, 23' and 23'' to become energized. The same interaction of switches 28, 28' and 28'' and lamps 24, 24' and 24'' is also valid.

Returning any of the energized lamps to their normal state of being de-energized is effected by simply interrupting the conducting path for electrical energy. The normally closed push button switches 25, 25' and 25'' are connected in series between the supply lead marked + and the interconnection lead marked A to perform the de-energizing process. Opening any of these RESET switches will interrupt the electrical energy flow through the lamps 22, 23, 24, 22', 23', 24', 22'', 23'' and 24'' and silicon control rectifiers 30, 31, 32, 30', 31', 32', 30'', 31'' and 32'', thereby returning the silicon control rectifiers to their normal state of non-conduction. Once this has been accomplished, the RESET switch may be returned to its normally closed position and the lamps will remain de-energized.

The function of diode rectifiers 33, 34 and 35 shown in FIG. 5 is to provide a path of electrical energy flow from the lamp flashing circuit shown in box 44 of FIG. 3. If any of the lamps 22, 23 or 24 is energized, a path from the flasher circuit 44 through any one or more of the aforementioned diode rectifiers and the corresponding silicon control rectifiers to the lead marked − is provided. This, in turn, causes the flasher circuit 44 to alternately energize and de-energize RESET lamps 29, 29' and 29''. The flasher circuit 44 and its operation are well known to those skilled in the art, so no detailed description will be provided. The RESET or recognition signal lamps 29 flash on and off to aid in attracting the attention of the user to the fact that a message is being sent, the flashing of these lamps only occuring when one or more of the signal lamps is energized.

It will be apparent from the foregoing that we have provided an improved signaling communication system which is not only simple and economical to install and operate but is effective to invite the attention of the recipient of the signal or message to enable the recipient of the signal or message to acknowledge receipt of same. It will be understood that various changes and modifications can be made in the details of construction, operation and use without departing from the spirit of the invention, especially as defined in the following claims.

We claim:

1. A communication system comprising:

a. a plurality of interconnected signaling units adapted to be placed in different locations, each unit having a plurality of corresponding signal lamps;

b. a plurality of actuating means on each unit, each associated with one signal lamp for simultaneously actuating said signal lamp and the corresponding signal lamp of all other units, each of said actuating means including a silicone controlled rectifier circuit and switching means for biasing said silicone rectifier circuit into a conductive condition whereby the signal lamps are maintained in an on condition regardless of subsequent state of said switching means; and c. recognition means on each of said plurality of signaling units for simultaneously returning the silicone controlled rectifier circuits to a nonconductive state to turn off the signal lamps.

2. A system as defined in claim 1 wherein said recognition means includes:

a reset lamp;

circuit means energized in response to the on condition of one or more of said signal lamps, said circuit means causing said reset lamp to flash as an indication that one or more of said signal lamps has been energized; and reset switching means for rendering said SCR circuits nonconductive.

* * * * *